UNITED STATES PATENT OFFICE.

BERNHARD RICHARD, OF BASEL, SWITZERLAND, ASSIGNOR TO THE ANILINE COLOR AND EXTRACT WORKS, FORMERLY JOHN R. GEIGY, OF BASEL, SWITZERLAND.

MORDANT-DYEING AZO DYES AND PROCESS OF MAKING SAME.

991,750.     Specification of Letters Patent.     Patented May 9, 1911.

No Drawing.     Application filed October 1, 1910. Serial No. 584,943.

*To all whom it may concern:*

Be it known that I, BERNHARD RICHARD, a subject of the King of Bavaria, doctor of philosophy, residing at Basel, Switzerland, have invented certain new and useful Improvements in New Mordant-Dyeing Azo Dyes and Processes of Making Same, of which the following is a specification.

My invention relates to certain new and useful improvements in coloring matters and to the methods of preparing the same and has for its object the preparation of coloring matters by combining diazo-p-nitranilin-o-sulfonic acid with oxy-carboxylic acids of the benzene series.

The known azo coloring matter obtained from p-nitranilin and salicylic acid besides being difficult to dissolve, which renders it unsuitable for many purposes, has the further disadvantage that it produces dyeings that are not fast to milling and potting. I have now found that coloring matters can be obtained from p-nitranilin-o-sulfonic acid and salicylic acid, as well as its homologues, which do not possess these disadvantages.

While the diazo-p-nitranilin-o-sulfonic acid is easily decomposed and rendered unsuitable for combining with the oxy-carboxylic acids of the benzene series, I have discovered that diazo-p-nitranilin-o-sulfonic acid can be combined with oxy-carboxylic acids of the benzene series in the presence of non-decomposing substances, a member of which I have found do not destroy or seriously impair the diazo-p-nitranilin-o-sulfonic acid. Among these non-decomposing substances which can be employed are weak alkaline solutions; or the oxids of magnesium, zinc or the alkaline earths or hydroxids of the same. I have further discovered that even strong alkaline solutions may be employed as non-decomposing substances when combining diazo-p-nitranilin-o-sulfonic acid with a meta compound of oxy-carboxylic acid of the benzene series, such as m-cresotinic acid.

The following examples serve as typical examples of the way in which my invention may be practiced:

1. 23.5 kg. of the ammonium salt of p-nitranilin-o-sulfonic acid are diazotized with 7 kg. of sodium nitrite and 30 kg. hydrochloric acid of 20° Bé. The diazo compound thus formed is isolated and thoroughly mixed with 14 kg. of salicylic acid in water and 20 kg. of magnesium oxid are stirred into the above well cooled mixture. When the combination is complete the mixture is warmed, mixed with hydrochloric acid to dissolve the excess of magnesium oxid and filtered. The filtrate is further treated with hydrochloric acid until it shows a slightly acid reaction, the coloring matter precipitated by means of salt, filtered, pressed and dried. This dye stuff dyes wool in an acid bath orange-yellow shades which are changed by chromating to red-orange shades fast to milling and potting.

If o-cresotinic acid is employed instead of salicylic acid, a coloring matter is obtained with the same general qualities but of a somewhat redder shade of its chromated dyes.

2. 15.5 kg. of m-cresotinic acid are dissolved in the quantity of soda necessary for the formation of the neutral sodium salt. To this solution the isolated diazo compound of nitranilin sulfonic acid prepared according to Example 1 is added and into the well cooled solution, an aqueous solution of 8 kg. of calcined soda is run slowly with constant stirring. When the combination is complete, salt is added, the mixture is filtered, pressed and dried. The dye-stuff thus produced, dyes a shade upon chrome-mordanted wool which is somewhat redder than that produced from the dye stuff of Example 1.

The new coloring matters form orange powders soluble in water to a yellow-orange solution which on the addition of a caustic alkali turns to bluish-red; which are soluble in concentrated sulfuric acid to a yellow-orange solution; which dye wool orange-yellow shades from an acid bath, which shades on a subsequent treatment with chromium compounds are converted into red-orange shades possessing fastness to milling and potting and which upon reduction with stannous chlorid and hydrochloric acid, yield para-phenylene-diamin sulfonic acid and a 5-amino-2-oxy-carboxylic acid.

I do not limit myself to the exact proportions and quantities stated above but what I claim and desire to secure by Letters Patent is:

1. The process of producing new dye stuffs by combining equi-molecular proportions of diazo-p-nitranilin-o-sulfonic acid and o-oxy-carboxylic acids of the benzene series.

2. The process of producing new dye-stuffs by diazotizing p-nitranilin-o-sulfonic acid and combining the diazo body thus obtained with o-oxy-carboxylic acids of the benzene series in the presence of a non-decomposing substance.

3. As new products, the dye-stuffs obtainable by combining equi-molecular proportions of diazo-p-nitranilin-o-sulfonic acid and o-oxy-carboxylic acids of the benzene series, forming orange powders, soluble in water to a yellow-orange solution which on the addition of a caustic alkali turns to bluish-red; which are soluble in concentrated sulfuric acid to a yellow-orange solution; which will dye orange-yellow shades from an acid bath, which shades on a subsequent treatment with chromium compounds are converted into red-orange shades possessing fastness to milling and potting; and which yield upon reduction with stannous chlorid and hydrochloric acid, para-phenylene-diamin sulfonic acid and a 5-amino-2-oxy-carboxylic acid.

In testimony whereof I have signed this specification in the presence of two subscribing witnesses.

BERNHARD RICHARD.

Witnesses:
 GEO. GIFFORD,
 ARNOLD ZUBER.